Oct. 26, 1965 W. F. McKEE 3,214,120
CONTAINER CARRIER AND LID LOCK
Filed Aug. 30, 1963

INVENTOR.
WAYNE F. McKEE
BY
ATTORNEY

United States Patent Office 3,214,120
Patented Oct. 26, 1965

3,214,120
CONTAINER CARRIER AND LID LOCK
Wayne F. McKee, 2201 Teller St., Lakewood, Colo.
Filed Aug. 30, 1963, Ser. No. 305,450
3 Claims. (Cl. 248—129)

The present invention relates to a can carrier and lock mechanism that is useful in the handling and storage of loose materials receiving containers. Particularly, this invention relates to a wheeled type cart incorporating features whereby the cart securely receives and holds a closed type container, such as a G.I. can or garbage pail, so that such container may be conveniently moved between points of collection and disposal. In order to assure security of the materials stored and also to prevent loss of the container lid, a special lock mechanism is incorporated for holding such lid in either an open or closed position as necessary to facilitate use of the container.

A specific object of the present invention is to provide a wheeled carrier that may be used to support garbage and trash cans so that such can and its associated carrier may be easily moved from the point of desirable storage to prescribed points of community collection or disposal.

In addition to the provision of a wheeled cart which will facilitate the movement of the carrier and any container carried thereon, it is an object of this invention to provide a lock mechanism associated with the wheeled carrier and the lid of such container so that the lid will regularly be held in its closed position on the container but will be movable to a locked and secure out-of-the-way, open position. When the lid is in its open position, additional materials may be placed in or removed from the container or the container itself may be conveniently removed from the carrier for dumping. In connection with the provision of a two-position lock mechanism for the lid handle, it has been an object of the invention to provide a simple and economical construction of sturdy design.

A specific object of such construction is the provision of a lock handle that may be engaged with a container lid so that the handle and attached lid are easily movable to alternate open and closed positions and in which the lid and handle tend to move toward each alternate position once movement to the new desired position has been initiated.

Other and worthwhile objectives of such carrier and lock combination that are of considerable usefulness and beneficial advantage are inherent in the combined system which as a whole provides new and novel means for the convenient handling, collection, storage and disposal of loose materials.

Figure 2:
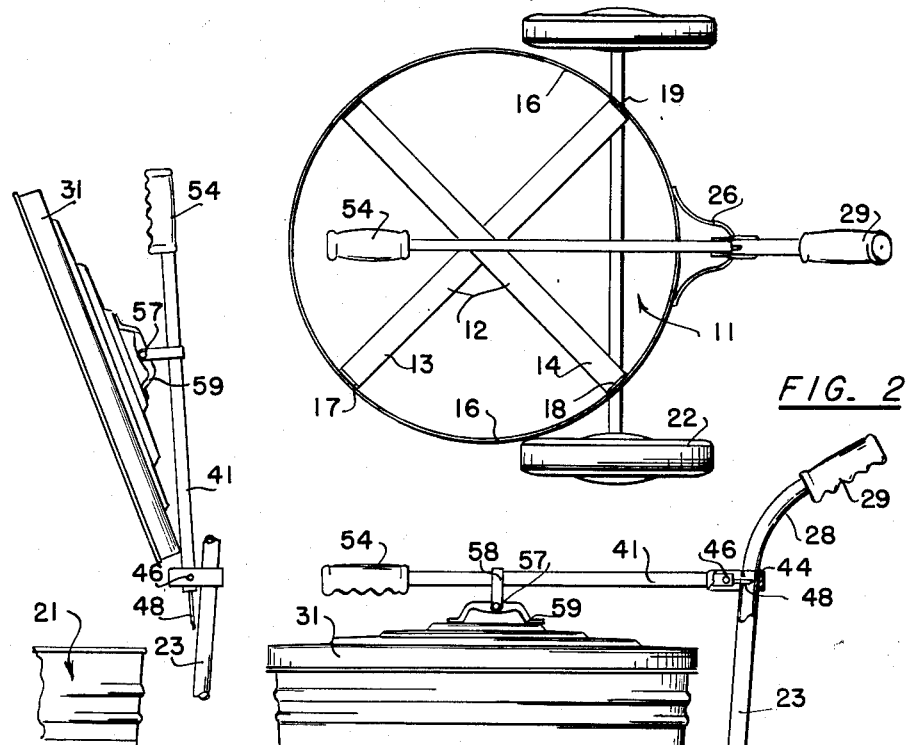
Figures 1, 3:
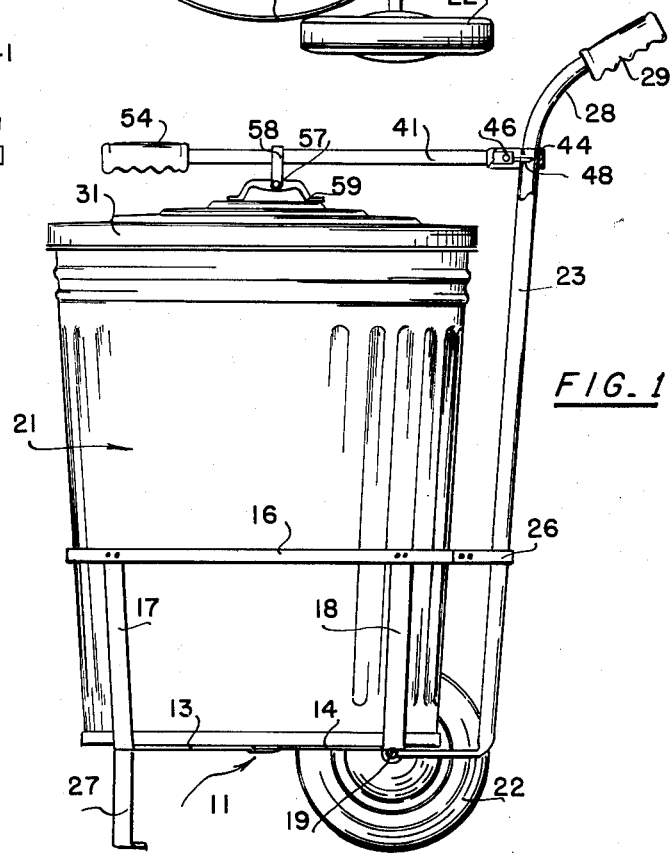
Figure 4:
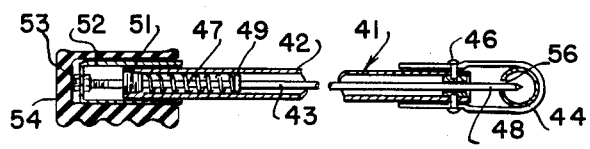

Further objects and advantages of the present invention will be apparent from the appended description and drawings, in which FIG. 1 is a side elevation in partial broken section illustrating an overall embodiment of the invention, FIG. 2 is a top plan view showing features of the carrier with the lid and container of the FIG. 1 illustration removed, FIG. 3 is a partial side elevation showing an alternate raised and locked position for the lid lock handle and lid, and FIG. 4 is a broken cross section illustrating operating features of said lid lock.

Briefly stated, the present invention provides a wheeled cart carrier especially adapted to receive closed type containers similar to conventional G.I. cans and garbage pails. The carrier provides a base mount and support for holding the container in secure upright position, and such support includes a container surrounding hoop for the secure holding of such container. Adjacent the upper end of the carrier handle a lid lock handle is provided which is adapted for engagement to the lid of such conventional containers. When engaged at a proper balanced position, the lid lock serves, first, to hold the lid closed on the container, and, secondly, to hold the lid in raised out of the way position when it is desired that the interior of the container be exposed for the introduction of removal of materials. The lid lock mechanism includes the use of a reciprocating rod, the selective extension of which serves to hold the mechanism and associated lid in the alternate positions as desired.

Special features of a preferred embodiment of the invention are shown in the accompanying drawings, in which it will be noted that the assembly includes a carrier or cart unit 11 for transportation purposes. The carrier structure has a base frame 12 made up of crossed strap members 13 and 14 and angularly rising strap extensions 17 and 18, respectively. These strap extensions are engaged at their upper extremity by a circular hoop element 16 which reinforces and strengthens the frame 12 and defines therewith a central opening conveniently adapted for the reception of conventional types of containers 21.

The lower part of the frame 12 is disposed above and welded to a wheel axle 19 so that conventional type rubber tired wheels 22 may be positioned on the outer ends of said axles for free rotation. An operator handle 23 having a lower forward extension 24 is welded to the axle 19 and passes through a reinforcing loop 26 which is spot welded to the hoop 16. The reinforcing loop 26 may be unitarily formed of an extension of the material of hoop 16. A foot rest 27 completes the base frame structure. Since the upper end of the handle 23 is bent, as at the curved section 28, a handle grip 29 on such upper end of the handle is disposed in convenient position to be gripped by any operator or user who desires to move the carrier 11 or the carrier and its received container 21.

In addition to providing convenient means for the transportation and movement of such containers, it is a prime object of this invention to provide means for securely holding a lid for such containers in alternate open or closed positions. Since containers of the described general type are often used for the outdoors storage of loose materials or for the collection of garbage and refuse, it is highly desirable that some positive means be provided for holding the lid closed on such containers. A securely closed lid prevents access to the contents of the container by dogs or other animals and further prevents the loss of contamination of received materials by wind and other weather elements.

In connection with collection containers, it has also been found to be highly desirable to provide secure storage and emplacement for the lid when the container itself is being dumped. Such secure storage prevents loss of the lid due to the mishandling thereof by collector personnel. The handle and lock mechanism 41 illustrated in FIGURE 4 and operatively shown in the other figures of this application provides a desirable means for holding a container lid 31 either in closed position securely on the container 21 or in open position raised above the container in such manner that the container itself may be easily and conveniently removed from the carrier 11. The lid handle and lock mechanism 41 is in its preferred construction an operative assembly of a hollow tube 42, an inner reciprocating rod 43, a mount element 44 for joining said lock mechanism 41 to the handle 23, a pivot 46 about which the lock mechanism may be rotated, and spring type force exerting means 47 for biasing the rod 43 and its contact end 48 to a desirable extended position. As shown in FIGURE 4, the spring 47 is disposed about the rod 43 for compression between a stop shoulder 49 on the rod 43 and a plug element 51 having a central hole therethrough (not shown) as the rod is moved reciprocally. The handle end of the rod 43 is engaged and secured to a slide tube 52 by means of lock nuts 53, and the slide tube 52 is of size for reciprocal movement on the surface of tube 42. A handle grip 54 placed on the slide tube 52 provides a secure grip so that the rod 43 may be moved reciprocally outwardly against the spring 47 to compress the spring and to retract the contact end 48. When the rod is retracted, the lid handle and lock mechanism 41 may be moved pivotally about its hinge pin 46 to an elevated out of way position as shown in FIGURE 3. After the handle is raised through a minor arc in its movement toward this position, the gripping force may be released, and subsequent re-extension of the contact end 48 of rod 43 will cause the end to come into engagement with the exterior surface of the handle 23 with a force of engagement sufficient to complete the movement of such handle toward its alternate open or raised position as illustrated. As previously set forth, when the handle is in this raised position, the container 21 may be easily raised away from the base frame 12 and out of the hoop structure 16 to be dumped or stored or for other purposes. The lid 31 remains in its desired position on the carrier 11 unless the pin 57 on the mounting strap 58 is removed to release the lid handle 59. With this arrangement the lid, though out of the way, is still secured to the carrier and is not subject to loss through mishandling by collection and dumping personnel.

When the container 21 is replaced in the carrier 11, the lid may be easily closed thereon by again pulling on the handle grip 54. As in the previous instance, this function retracts the contact end 48, and the lid is lowered to position of engagement. Release of the handle grip 54 will bring the contact end 48 of rod 43 through the opening 56 to hold the handle and lock mechanism 41 in securely closed position. Inasmuch as the lid 31 is engaged to the lid handle and lock mechanism 41 at a position slightly inboard of its central balance point, the lid itself has a natural tendency to move toward its closed position, and, accordingly, the handle grip 54 may be released before the rod 43 is aligned with the opening 56, and all of the elements will still move under gravitational forces to the described closed and locked position.

The described embodiment of the invention represents a considerable improvement, inasmuch as such embodiment provides for the secure, safe and convenient handling of closed type containers. The particular embodiment may be made economically out of strap iron and tubing materials that are easily bent, formed, riveted or welded to provide a strong and sturdy structure. The completed structure provides means not only for the easy handling of even heavy loaded containers, but it also provides a firm base and support for such containers when emptied or partially loaded. The wide base defined by the wheels 22, the cross straps 13 and 14 and the foot rest 27 keeps the assembly from being overturned by wind or large animals. The combination of secure storage and easy handling, together with the two-positioned locking of the lid element and the retention thereof during periods of container removal lends novelty and usefulness to the present embodiment of the invention.

These features of novelty, convenience, usefulness and security may be conveniently adapted to other embodiments of the invention, and, accordingly, it is to be understood that all such modifications and changed embodiments as come within the scope of the hereunto appended claims are considered to be a part of this invention.

I claim:

1. A carrier and lid lock assembly to facilitate the collection, storage and dumping of loose materials into and from conventional lid closure types of containers comprising a carrier base frame, wheels on said frame, a support mount on said base frame, said frame and support mount providing with said wheels a substantial base for the reception and secure holding of said containers, an operator handle on said carrier, a lid lock and handle mechanism pivotally mounted on said operator handle, a lid for said container on said lid lock handle for movement therewith to alternate raised and lowered pivotal positions when it is desired to open or close off access to said container and any received loose materials therein, a lock mechanism operatively on said lid lock handle for holding said handle and received container lid in the desired selected positions, a catch element on said operator handle, a reciprocating lock mechanism on said lid lock handle, and a lock rod extension for selective extension and retraction past the end of said lock handle for engagement selectively with said catch and the exterior surface of the operator handle to hold said lock handle and received container lid alternately in the locked lowered and the raised out-of-way positions.

2. A carrier and lid lock assembly to facilitate the collection, storage and dumping of loose materials into and from conventional lid closure types of containers comprising a carrier base frame, wheels on said frame, a support mount on said base frame, said frame and support mount providing with said wheels a substantial base for the reception and secure holding of said containers, an operator handle on said carrier, a lid lock and handle mechanism pivotally mounted on said operator handle, a lid for said container on said lid lock handle for movement therewith to alternate raised and lowered pivotal positions when it is desired to open or close off access to said container and any received loose materials therein, a lock mechanism operatively on said lid lock handle for holding said handle and received container lid in the desired selected positions, a catch element on said operator handle, a reciprocally mounted rod on said lock handle with an extension end of said rod being selectively extensible past the end of said lock handle to selectively engage said catch and the operator handle, and spring means urging said reciprocating rod toward a fully extended position for alternately holding said lock handle in its desired raised and lowered pivotal positions.

3. A carrier and lid lock assembly to facilitate the collection, storage and dumping of loose materials into and from conventional lid closure types of containers comprising a carrier base frame, wheels on said frame, a support mount on said base frame, said frame and support mount providing with said wheels a substantial base for the reception and secure holding of said containers, an operator handle on said carrier, a lid lock and handle mechanism pivotally mounted on said operator handle, a lid for said container on said lid lock handle for movement therewith to alternate raised and lowered pivotal positions when it is desired to open or close off access to said container and any received loose materials therein, said operator handle providing an opening adjacent the pivotal mounting for said lid lock handle, a reciprocally mounted rod on said lock handle with an extension end of said rod being selectively extensible past the end of said lock handle to engage said operator handle and the said opening therein, and means urging said reciprocating rod toward a fully extended position for alternately holding said lock handle in the desired raised and lowered pivotal positions.

References Cited by the Examiner

UNITED STATES PATENTS

| | | | |
|---|---|---|---|
| 1,842,210 | 1/32 | Scruton | 248—147 |
| 2,717,706 | 9/55 | Yow et al. | 214—383 |
| 2,745,676 | 5/56 | Scott | 248—129 X |
| 2,930,561 | 3/60 | Bittle | 248—149 |
| 3,003,728 | 10/61 | Shaw | 248—154 |
| 3,041,030 | 6/62 | Heimrich | 248—129 |

CLAUDE A. LE ROY, *Primary Examiner.*